(12) United States Patent
Takamura

(10) Patent No.: US 10,800,035 B2
(45) Date of Patent: Oct. 13, 2020

(54) CENTER-OF-GRAVITY-OF-LOAD POSITION CALCULATOR FOR ROBOT AND METHOD THEREOF

(71) Applicant: DENSO WAVE INCORPORATED, Chita-gun, Aichi-pref. (JP)

(72) Inventor: Noritaka Takamura, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 277 days.

(21) Appl. No.: 15/926,192

(22) Filed: Mar. 20, 2018

(65) Prior Publication Data

US 2018/0272531 A1    Sep. 27, 2018

(30) Foreign Application Priority Data

Mar. 23, 2017 (JP) ................................ 2017-057395

(51) Int. Cl.
*B25J 9/16* (2006.01)
*B25J 9/00* (2006.01)

(52) U.S. Cl.
CPC ........... *B25J 9/1638* (2013.01); *B25J 9/0048* (2013.01); *B25J 9/1635* (2013.01)

(58) Field of Classification Search
CPC ....... B25J 9/1638; B25J 9/0048; B25J 9/1635
See application file for complete search history.

(56) References Cited

U.S. PATENT DOCUMENTS

2015/0039128 A1\* 2/2015 Oaki ...................... B25J 9/1651
                                                                    700/253

FOREIGN PATENT DOCUMENTS

JP          5327722 B2    10/2013

\* cited by examiner

*Primary Examiner* — Basil T. Jos
(74) *Attorney, Agent, or Firm* — Oliff PLC

(57) ABSTRACT

A center-of-gravity-of-load position calculator is provided which determines the position of the center of gravity of a physical load held by a horizontal four-axis robot arm. The center-of-gravity-of-load position calculator moves horizontally move the physical load a plurality of times in conditions where positions of a fourth axis are different from each other and measures degrees of torque acting on the fourth axis during such movement to calculate given first and second parameters. The center-of-gravity-of-load position calculator calculates the position of the center of gravity of the physical load as a function of the first and second parameters. This achieves fast and easy calculation of the position of the center of gravity of the physical load.

8 Claims, 8 Drawing Sheets

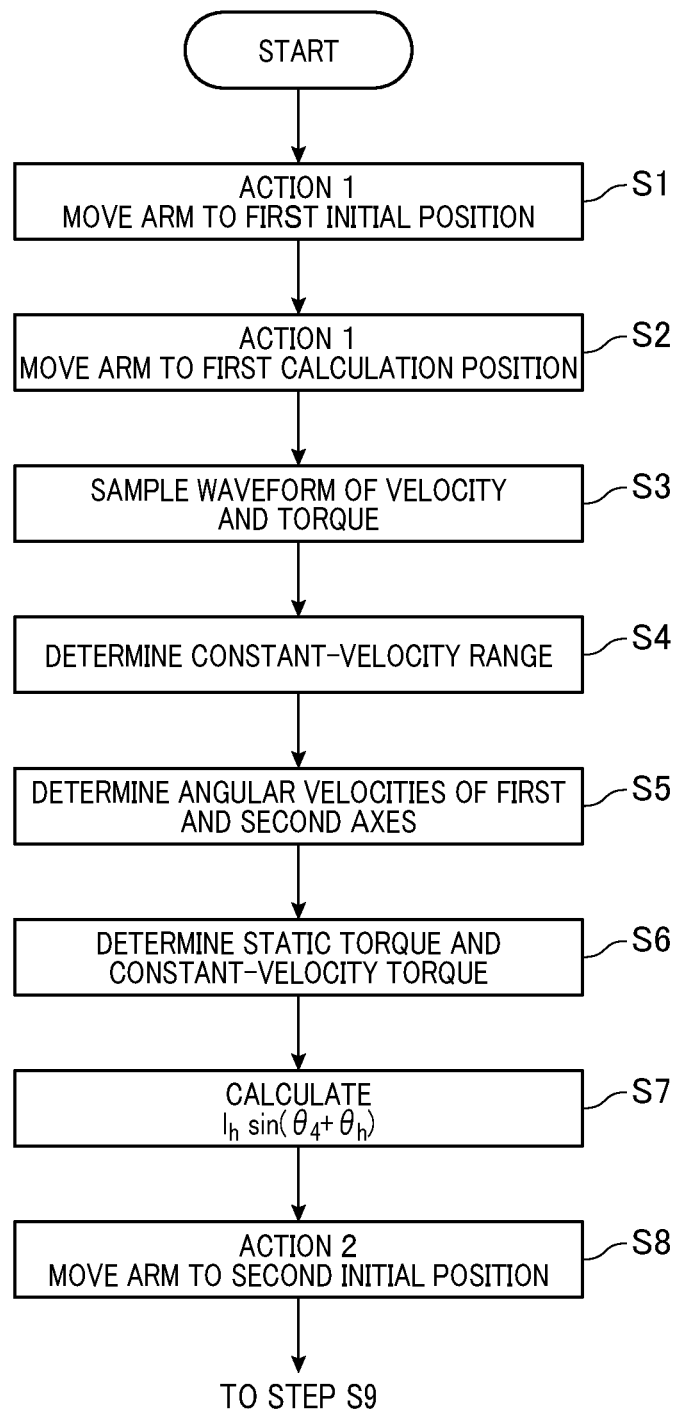

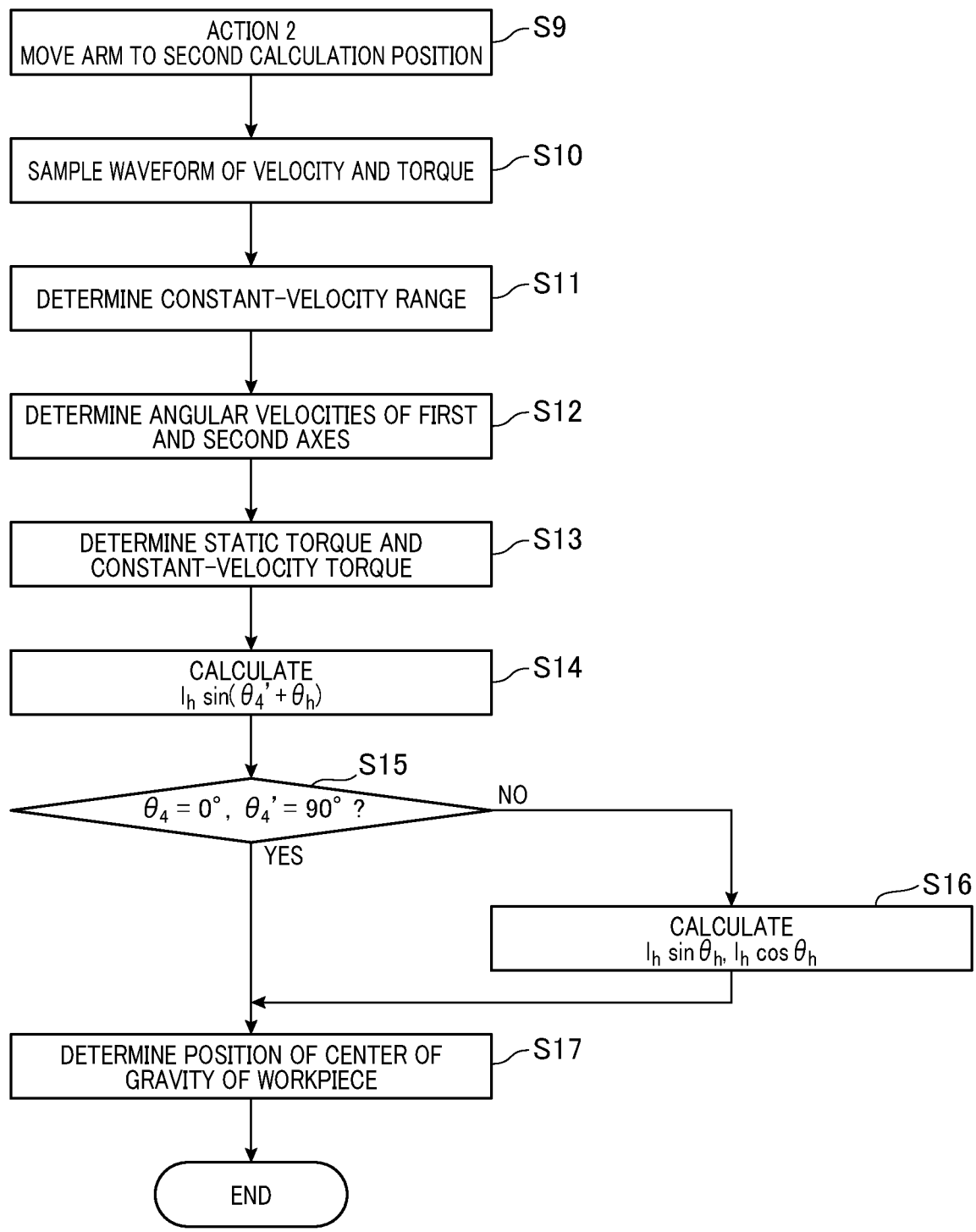

CENTRIFUGAL FORCE F WHEN 1st AND 2nd AXES ARE BEING ACTUATED, AND 4th AXIS IS NOT ACTUATED $$F = m\{(2\omega_1 + \omega_2)\omega_2 L_2 + \omega_1^2(L_1 + L_2)\}$$

→ CENTRIFUGAL TORQUE ACTING ON 4th AXIS $$\tau_{f4} = F l_h \sin(\theta_2 + \theta_4 + \theta_h)$$

CENTER-OF-GRAVITY-OF-LOAD POSITION CALCULATOR FOR ROBOT AND METHOD THEREOF

CROSS REFERENCE TO RELATED DOCUMENT

The present application claims the benefit of priority of Japanese Patent Application No. 2017-057395 filed on Mar. 23, 2017, the disclosure of which is incorporated herein by reference.

BACKGROUND

1. Technical Field

The invention relates generally to a center-of-gravity-of-load position calculator which calculates the position of the center of gravity of a physical load held by an end of a horizontal four-axis robot arm and a method thereof.

2. Background Art

Japanese Patent No. 5327722 discloses a technique of calculating the position of the center of gravity of a workpiece (i.e., a physical load) held by a vertical six-axis robot arm.

The vertical six-axis robot arm is typically capable of actuating a fifth axis to exert the force of gravity on the workpiece and thus calculating the position of the center of gravity of the workpiece. The technique, as taught in the above publication, is available only for the vertical six-axis robot arm. It is, thus, impossible to use such a technique in a horizontal four-axis robot arm which is not capable of changing the position of the workpiece where the force of gravity acts on the workpiece.

SUMMARY

It is, therefore, an object of this disclosure to provide a center-of-gravity-of-load position calculator which calculates the position of the center of gravity of a physical load held by a horizontal four-axis robot arm and a method thereof.

According to one aspect of this disclosure, there is provided a center-of-gravity-of-load position calculator for a horizontal four-axis robot arm which is equipped with a first, a second, a third, and a fourth axis. The center-of-gravity-of-load position calculator comprises a first velocity determiner and a first torque determiner. The first velocity determiner actuates at least one of the first axis and the second axis of the horizontal four-axis robot arm which is holding a physical load on an end thereof to move the robot arm from a first initial position to a first calculation position. The physical load has a known mass. The first velocity determiner works to determine a velocity of the one of the first axis and the second axis in a constant-velocity range where the velocity of the one of the first and second axes is constant in a first action period of time between when the arm is at the first initial position and when the arm reaches the first calculation position.

The first torque determiner which determines a static torque and a constant-velocity torque.

The static torque is torque exerted on the fourth axis to hold the fourth axis from being rotated, in other words, keep the fourth axis at an angular position thereof before the one of the first and second axes is actuated in the first action period of time. The constant-velocity torque is torque required for the fourth axis (i.e., the motor for use rotating the fourth axis) to cancel torque which results from rotation of one of the first and second axes and acts on the fourth axis so as to keep the fourth axis stationary while the one of the first and second axes is being actuated in the first action period of time.

The center-of-gravity-of-load position calculator also includes a first parameter calculator, a second velocity determiner, a second torque determiner, a second parameter calculator, and a center-of-gravity position calculator.

The first parameter calculator calculates a first parameter according to an equation below which is derived using the velocity and the static torque, $$T_1 = l_h \sin(\theta_4 + \theta_h)$$

where $T_1$ is the first parameter, $l_h$ is a center-of-gravity distance between the fourth axis and the center of gravity of the physical load, $\theta_4$ is a position of the fourth axis, and $\theta_h$ is a center-of-gravity direction expressed by an angular position of the physical load based on the position $\theta_4$.

The second velocity determiner actuates at least one of the first axis and the second axis of the robot arm to move the robot arm from a second initial position to a second calculation position. The second initial position is a position of the arm where the position of the fourth axis is changed to a position $\theta_4'$ from that of the fourth axis when the arm is at the first initial position. The second calculation position is a position of the arm where only the position of the fourth axis is changed from that thereof when the arm is at the first calculation position. The second velocity determiner works to determine a velocity of the one of the first axis and the second axis in a constant-velocity range where the velocity of the one of the first and second axes is constant in a second action period of time between when the arm is at the second initial position and when the arm reaches the second calculation position.

The second torque determiner determines the static torque and the constant-velocity torque of the fourth axis in the second action period of time.

The second parameter calculator calculates a second parameter according to an equation below which is derived using the velocity and the static torque, as determined by the second velocity determiner, $$T_2 = l_h \sin(\theta_4' + \theta_h)$$

where $T_2$ is the second parameter, and $\theta_4'$ is the position of the fourth axis when the arm is at the second initial position.

The center-of-gravity position calculator calculates a position of the center of gravity of the physical load using the first and second parameters.

In brief, the center-of-gravity-of-load position calculator works to horizontally move the physical load a plurality of times in conditions where positions of the fourth axis are different from each other and measures degrees of torque acting on the fourth axis during such movement to calculate the first and second parameters $T_1$ and $T_2$. The center-of-gravity-of-load position calculator calculates the position of the center of gravity of the physical load as a function of the first and second parameters $T_1$ and $T_2$.

The position of the center of gravity of the physical load may be expressed below in terms of an x-y coordinate system.

$$x_{cog} = l_h \cos \theta_h$$

$$y_{cog} = l_h \sin \theta_h$$

The center-of-gravity-of-load position calculator is, thus, capable of calculating the position (i.e., the x-coordinate $x_{cog}$ and the y-coordinate $y_{cog}$) of the physical load held by the horizontal four-axis robot arm.

In the preferred mode, each of the first and second velocity determiner may work to actuate both the first and second axes in the first and second action period of times. This causes a greater degree of centrifugal force or torque to be exerted on the physical load, thereby enhancing the accuracy in calculating the position of the center of gravity of the physical load.

Each of the first parameter calculator and the second parameter calculator may set one of the positions $\theta_4$ and $\theta_4'$ of the fourth axis to 0° and other to 90°. This achieves fast and simple calculation of the center-of-gravity positions $x_{cog}$ and $y_{cog}$ of the physical load using the first and second parameters $T_1$ and $T_2$.

Each of the first velocity determiner and the second velocity determiner keeps the third axis at an upper limit thereof in the first action period of time or the second action period of time. This minimizes mechanical vibration transmitted from the third axis to the physical load when the arm is moved to the first or second calculation position, thereby enhancing the accuracy in calculating the position of the center of gravity of the physical load.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 1(a) and 1(b) are a flowchart of a sequence of logical steps executed to calculate the position of the center of gravity of a physical load according to an embodiment;

DESCRIPTION OF THE PREFERRED EMBODIMENT

Figure 9:
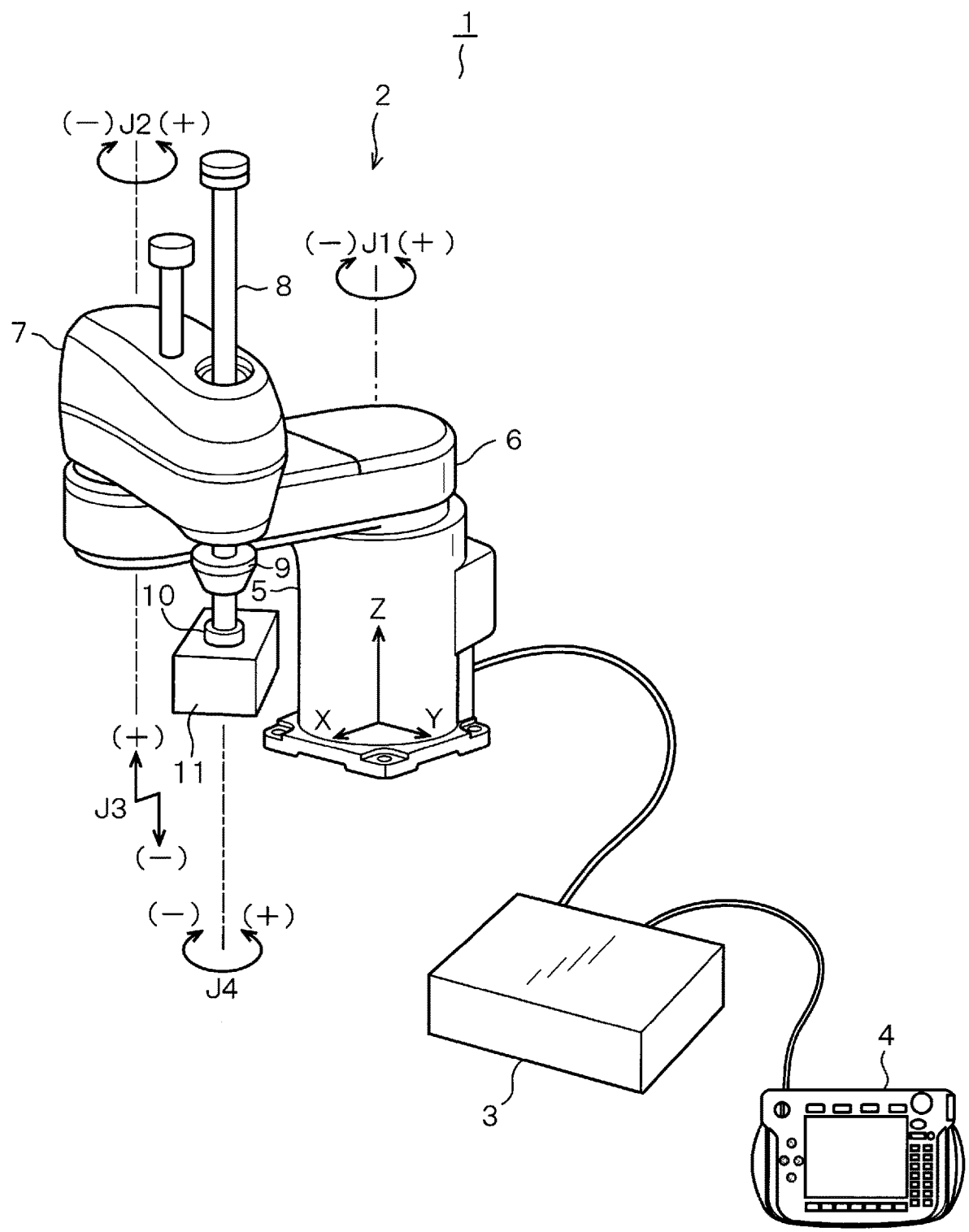
FIG. 9 is a perspective view which illustrates an industrial robot system according to an embodiment.

An embodiment will be described below with reference to the drawings. FIG. 9 illustrates a system structure of a typical industrial robot. Specifically, the robot system 1 includes the robot 2, the controller 3 for controlling an operation of the robot 2, and the teaching pendant 4 connected to the controller 3. The controller 3 works as a control unit and a center-of-gravity-of-load position calculator. The robot 2 is designed as, for example, a four-axis horizontal articulated robot. The robot 2 includes the base 5 secured to a mounting surface, the first arm 6, the second arm 7, and the shaft 8. The first arm 6 is joined to the base 5 to be rotatable around the first axis J1. The first axis J1 is a vertical axis whose longitudinal center line is aligned in a Z-axis direction in a Cartesian coordinate system, as defined below. The second arm 7 is joined to the top end of the first arm 6 to be rotatable around the second axis J2 whose longitudinal center line is aligned in the Z-axis direction. The shaft 8 is installed in a top end of the second arm 7 to be vertically movable and rotatable about its longitudinal axis. Specifically, the shaft 8 is vertically moved along the third axis J3 and rotatable around the fourth axis J4. The shaft 8 has the flange 9 which is positioned and detachably attached to a lower end of the shaft 8.

The base 5, the first arm 6, the second arm 7, the shaft 8, and the flange 9 function as an arm of the robot 2. The flange 9 that is a tip of the arm has a tool, for example, the air chuck 10 attached thereto. In the example of FIG. 9, the air chuck 10 is sucking the workpiece 11 as a physical load. The axes J1 to J4 of the robot 2 are driven by respective electrical motors, not shown. A position sensor, not shown, is arranged near each of the electrical motors to measure an angle of rotation and an angular position of a rotating shaft of the electrical motor.

Usually, industrial robots are designed to act according to an operation program made by executing given teachings. The controller 3 works to control the operations of the electrical motors according to the operation program in a feedback mode to control action of the arm of the robot 2.

The teaching pendant 4 works as an operation device and is designed to be of a rectangular flat box shape whose size enables a user or human operator to carry or hold it with his or her a hand to manually operate the teaching pendant 4. The teaching pendant 4 is equipped with a variety of keyswitches. The operator manipulates the keyswitches to input instructions to the teaching pendant 4. The teaching pendant 4 is connected to the controller 3 through a cable to achieve high-speed transfer of data between itself and the controller 3 through a communication interface. Information about instruction signals inputted through the keyswitches is transmitted from the teaching pendant 4 to the controller 3.

Figure 10:
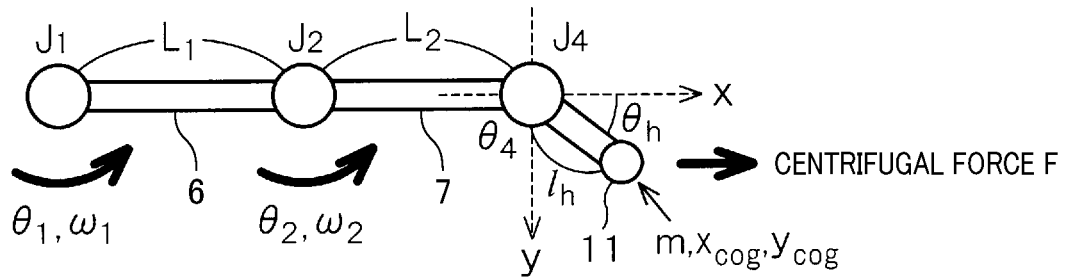
FIG. 10 is a view which shows a four-axis arm mode.

The principle of estimating or calculating the position of the center of gravity of the workpiece 11 including a tool will be described below. FIG. 10 illustrates a four-axis arm model of the robot 2. In the following discussion, an x-y or an x-y-z coordinate system (i.e., an x-y plane), as shown in FIG. 9, is used. Specifically, the x-y-z coordinate shown in FIG. 9 is a coordinate system where the origin is defined to be at the lower end of the axis J1. The x-y coordinate system shown in FIG. 10 is used to calculate the position of the center of the gravity of the workpiece 11. The x-axis in the x-y coordinate system is an axis, as denoted by "x" in FIG. 10, which passes straight through the centers of the axes J1, J2, and J4 when the arms 6 and 7 extend straight. The y-axis extends perpendicular to the x-axis. The z-axis extends perpendicular to the x- and y-axes.

The following discussion will refer to calculation of the center of gravity of the workpiece 11 using centrifugal torque acting on the fourth axis J4 when the first and second axes J1 and J2 of the arm are actuated or rotated. The mass m of the workpiece 11 including the tool is already known. In this disclosure, when the tool is also held by the shaft 8 (i.e., the air chuck 10), the mass m is mass of a combination of the workpiece 11 and the tool, while when the tool is not held by the shaft, the mass m is mass of only the workpiece 11. When the fourth axis J4 is fixed without being rotated, and the first and second axes J1 and J2 are actuated or rotated, the centrifugal force F acting on the fourth axis J4 is given by equation (1) below.

$$F = m\{(2\omega_1 + \omega_2)\omega_1 L_2 + \omega_1^2 (L_1 + L_2)\} \quad (1)$$

where $\omega_1$ is the angular velocity of the first axis J1, $\omega_2$ is the angular velocity of the second axis J2, $L_1$ is a linkage length of the first arm 6 (i.e., a distance, as illustrated in FIG. 10, between the center of the first axis J1 and the center of the second axis J2), and $L_2$ is a linkage length of the second arm 7 (i.e., a distance between the center of the second axis J2 and the center of the fourth axis J4).

The centrifugal force $\tau_{f4}$ acting on the fourth axis J4 is expressed as $$\tau_{f4} = F l_h \sin(\theta_2 + \theta_4 + \theta_h) \quad (2)$$

where $\theta_2$ is an angle (i.e., an angular position) of the second axis J2 in the x-y coordinate system, $\theta_4$ is an angle (i.e., an angular position) of the fourth axis J4 in the x-y coordinate system, $\theta_h$ is a center-of-gravity direction of the workpiece 11, and $l_h$ is a center-of-gravity distance of the workpiece 11. Note that the center-of-gravity direction is expressed by an angle (i.e., an angular position) of the workpiece 11 measured from the x-axis in FIG. 10 to the position of the center of gravity of the workpiece 11 in the x-y coordinate system. For example, when a line passing through the center of the fourth axis J4 and the center of gravity of the workpiece 11 when the fourth axis J4 is at 0° (04=0°) coincides with the x-axis, the center-of-gravity direction is 0°. Note that the center-of-gravity distance/h is a distance between the center of the fourth axis J4 and the position of the center of gravity of the workpiece 11 in the x-y coordinate system.

The torque $\tau_M$ acting on the electrical motor for any of the axes J1, J2, and J4 (i.e., axes horizontally rotating) when the robot 2 is actuated is expressed by equation (3) below.

$$\tau_M = \frac{(\tau_I + \tau_f + \tau_G + Frc)}{\text{Gear}} + \left(\frac{M_I d\omega}{dt} + M_{vis}\omega\right)\text{Gear} + M_{Frc} \quad (3)$$

where $\tau_I$ is inertia torque exerted on the motor, $M_I$ is inertial of the motor, $\tau_f$ is centrifugal torque exerted on the motor, $M_{vis}$ is viscosity of the motor, Gear is a gear ratio of the motor, $\tau_G$ is gravitational torque (i.e., force) which results from the gravity and acts on the motor, $M_{Frc}$ is friction of the motor, $\omega$ is angular velocity of the motor, Frc is frictional torque which results from friction of parts of the arm and acts on the motor, and $d\omega/dt$ is angular acceleration of the motor.

Figure 11:
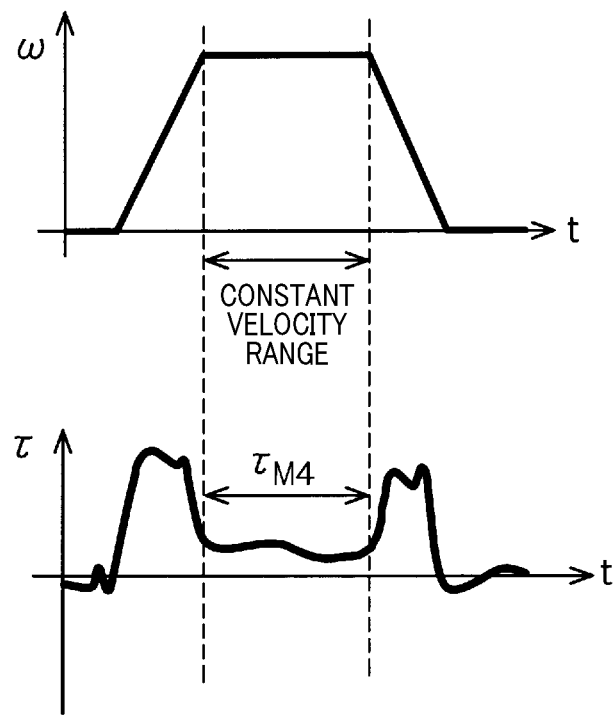
FIG. 11 is a view which represents motor torque $\tau_{M4}$ for a fourth axis of a robot arm in a constant-velocity range.

When the acceleration of each of the axes J1 to J4 is zero, the inertia torque $\tau_I$ will be zero. The motor torque $\tau_{M4}$ for the fourth axis J4 (i.e., torque acting on the motor for use in rotating the shaft 8) in a constant-velocity range, as represented in FIG. 11, is, therefore, expressed by equation (4) below.

$$\tau_{M4} = \frac{\tau_{f4}}{\text{Gear}} = \frac{F l_h \sin(\theta_2 + \theta_4 + \theta_h)}{\text{Gear}} \quad (4)$$

By setting $\theta_2$ to zero (i.e., $\theta_2=0$), and determining the motor toque $\tau_{M4}$ of the fourth axis J4, the following relation is met.

$$l_h \sin(\theta_4 + \theta_h) = \tau_{f4} \text{Gear}/F \quad (5)$$

The position of the center of gravity of the workpiece 11 is given below in terms of an x-coordinate $x_{cog}$ and a y-coordinate $y_{cog}$.

$$x_{cog} = l_h \cos \theta_h$$

$$y_{cog} = l_h \sin \theta_h \quad (6)$$

Therefore, the center-of-gravity position: the x-coordinate $x_{cog}$ and the y-coordinate $y_{cog}$ are derived by moving the arm of the robot 2 to change the fourth-axis angle $\theta_4$ two times to determine the motor torque $\tau_{M4}$ exerted on the fourth axis J4, and calculating the center-of-gravity distance $l_h$ and the center-of-gravity direction $\theta_h$.

The operation of this embodiment based on the above principle will be described below with reference to FIGS. 1 to 8. FIGS. 1(a) and 1(b) represent a flowchart of a center-of-gravity position calculating program executed by the controller 3.

After entering the program, the routine proceeds to step S1 wherein the arm of the robot 2 is moved to a first initial position. For instance, the first initial position is, as represented by a solid line in FIG. 2, given below.

$$(J1, J2, J3, J4) = J(-40, -40, 220, 0)$$

where J1, J2, J3, and J4 are positions of the first axis J1, the second axis J2, the third axis J3, and the fourth axis J4, respectively, and J is the position of the arm of the robot 2. In this embodiment, the positions of the first axis J1, the second axis J2, and the fourth axis J4 are expressed by angular positions thereof when they are 0° when the arms 7 and 8 are aligned with the x-axis. The counterclockwise direction, as illustrated in FIG. 9, is expressed by positive (+), while the clockwise direction is expressed by negative (−). The position of the third axis J3 is a vertical position thereof. When the shaft 8 is at a lower reference position (i.e., the origin in the x-y-z coordinate system shown in FIG. 10), the position of the third axis J3 is defined as 0. When the shaft 8 is at an upper limit, the position of the third axis J3 is denoted by 220. Thus, "J3=220" represents the vertical position of the third axis J3 (i.e., the shaft 8) when is located at the upper limit thereof.

Figure 2:
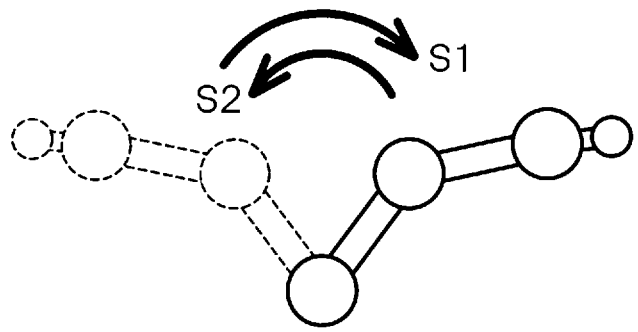
FIG. 2 is a view which illustrates a four-axis arm model when moved from a first initial position to a first calculation position.
Figure 3:
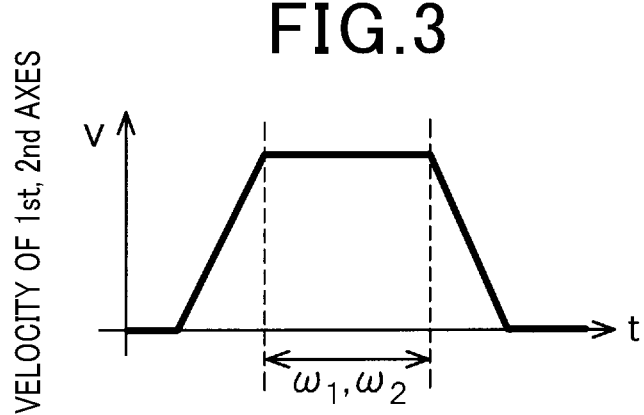
FIG. 3 is a view which shows waveforms of velocity of a first axis and a second axis.
Figure 4:
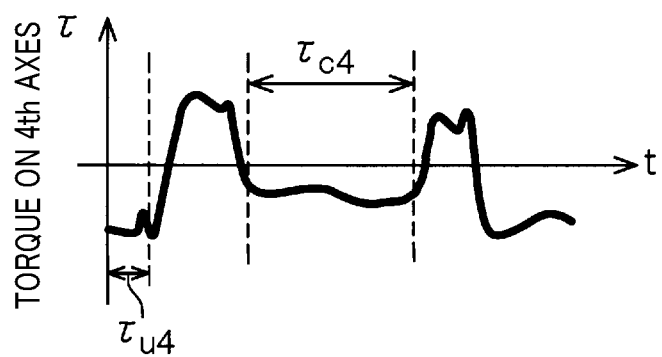
FIG. 4 is a view which shows a torque waveform of a fourth axis.

Next, the routine proceeds to step S2 wherein the arm is actuate or moved to a first calculation position, as represented by a broken line in FIG. 2. The first calculation position is set to, for example, J(40, 40, 220, 0). The fourth axis J4 is kept at the initial position J4=0. The controller 4 samples waveforms of velocities of the first and second axes J1 and J2 and a waveform of torque on the fourth axis J4 within a first action period of time until the arm reaches the first calculation position. FIGS. 3 and 4 show examples of such waveforms.

The routine proceeds to step S4 wherein the controller 3 analyzes the waveforms, as derived in step S3, to determine a constant-velocity range. The routine proceeds to step S5 wherein the controller 3 calculates angular velocities $\omega_1$ and $\omega_2$ of the first and second axes J1 and J2 in the constant-velocity range. The operation in step S5 constitutes a first velocity determiner. The routine proceeds to step S6 wherein the controller 3 also analyzes the torque waveform of the fourth axis J4 to determine static torque (also called holding torque) $\tau_{u4}$ on the fourth axis J4 and constant-velocity torque $\tau_{c4}$ on the fourth axis J4. The operation in step S6 constitutes a first torque determiner. The routine proceeds to step S7 wherein the above parameters are substituted into Eq. (5) to derive $l_h \sin(\theta_4+\theta_h)$. The centrifugal torque $\tau_{f4}$ is given by a difference between the constant-velocity torque $\tau_{c4}$ and the static torque $\tau_{u4}$.

$$l_h \sin(\theta_4+\theta_h)=(\tau_{c4}-\tau_{u4})\text{Gear}/F \quad (7)$$

Figure 5:
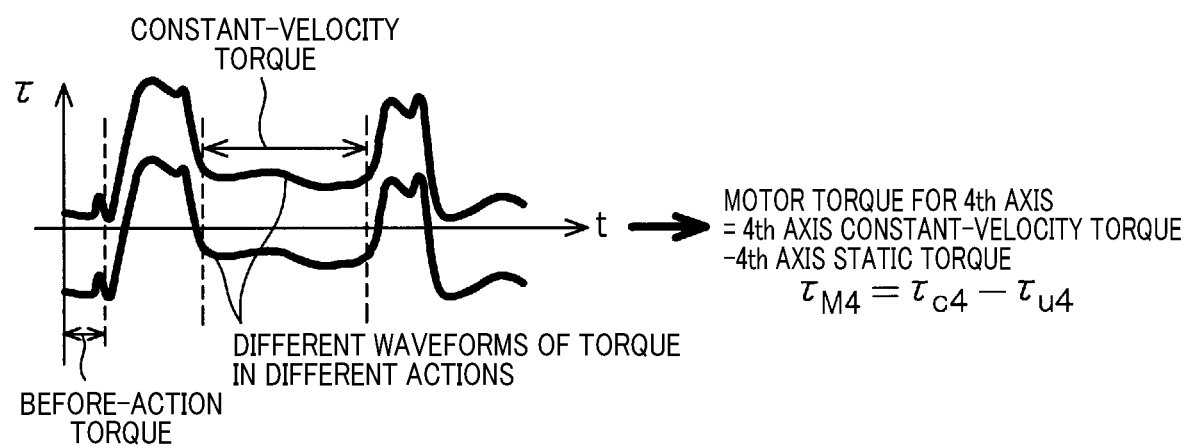
FIG. 5 is a view which explains adverse effects of static friction on a value of torque on a fourth axis.
Figure 6:
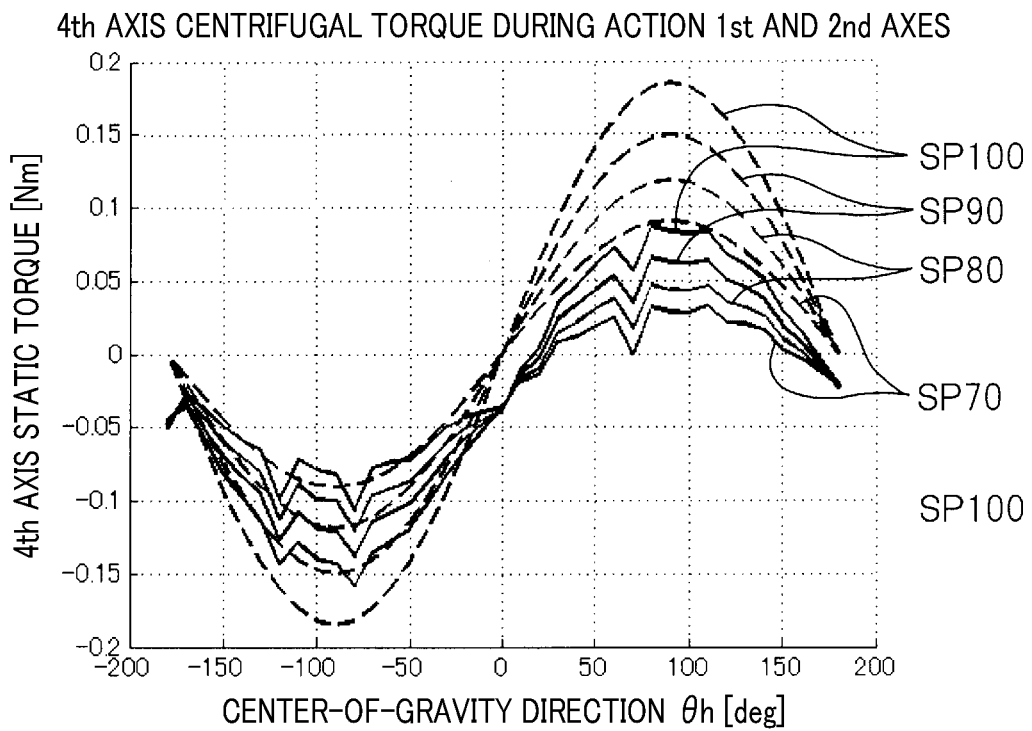
FIG. 6 is a view which represents an example of torque on a fourth axis which includes an error resulting from adverse effects of a static friction.
Figure 7:
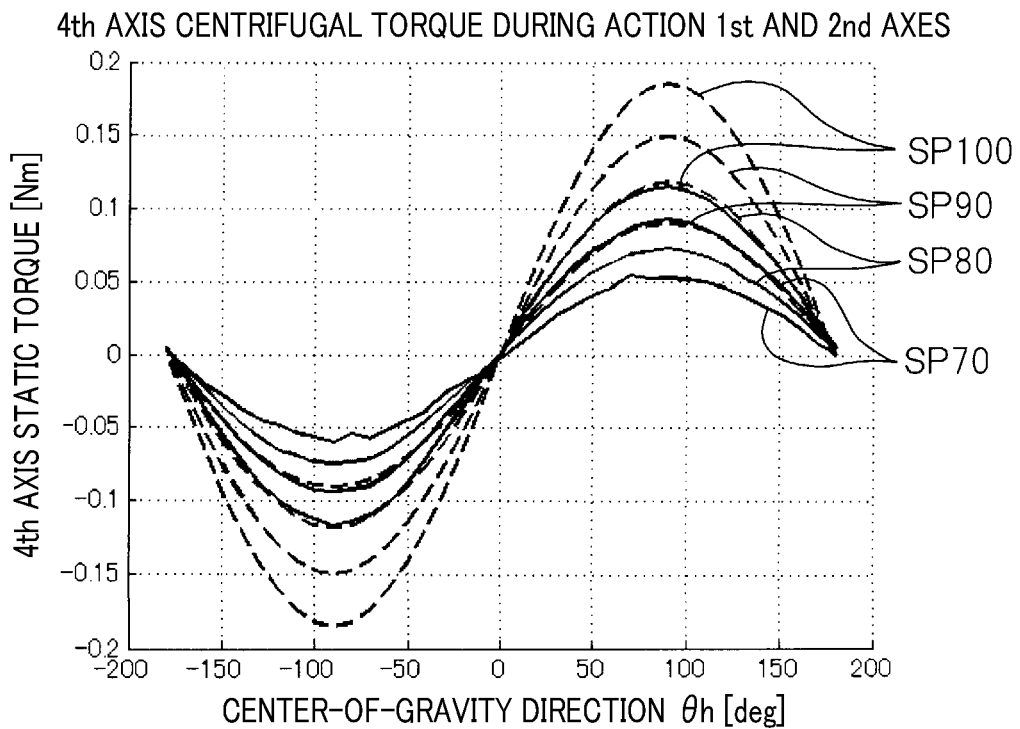
FIG. 7 is a view which represents an example of torque on a fourth axis from which an error resulting from adverse effects of a static friction is removed.
Figure 8:
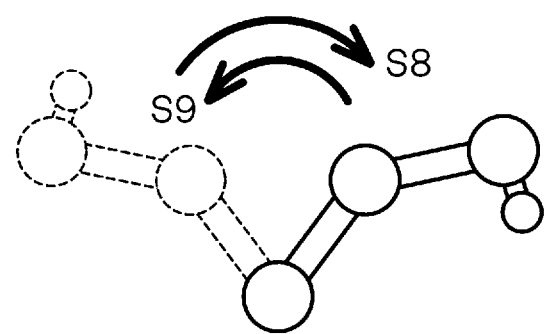
FIG. 8 is a view which shows a four-axis arm model when moved from a second initial position to a second calculation position.

Actually, the value of the fourth-axis torque, as demonstrated in FIG. 5, depends upon the static frictional force on the fourth axis J4. The adverse effect of the static torque is, therefore, eliminated, as shown in Eq. (7), by subtracting the static torque on the fourth axis J4 before the arm is actuated from the constant-velocity torque. FIG. 6 demonstrates an example of the fourth-axis torque which contains the adverse effect of the static torque. FIG. 7 demonstrates an example of the fourth-axis torque from which the adverse effects of the static torque is eliminated. In FIGS. 6 and 7, "SP" is the speed or velocity of the arm of the robot 2. Numeral "100", "90", "80", or "70" represents a percentage of the speed of the arm when 100% is a maximum speed of the arm.

The routine proceeds to step S8 wherein the arm of the robot 2 is moved to a second initial position. The second initial position is a position where only the position of the fourth axis J4 is changed from the first initial position, that is, from $\theta_4$ to $\theta_4'$. The second initial position of the arm is given by, for example, J(−40, −40, 220, 90).

The routine proceeds to step S9 wherein the arm is actuated or moved to a second calculation position. The second calculation position is, as represented by broken line in FIG. 8, a position where only the position of the fourth axis J4 is changed from that when the arm is at the first calculation position to $\theta_4'$ and given by, for example, J(40, 40, 220, 90).

The following steps S10 to S13 are the same in operation as steps S3 to S6 upon movement of the arm from the second initial position to the second calculation position. However, in step S11, constant-angular velocities $\omega_1'$ and $\omega_2'$ are derived. In step S12, the static torque $\tau_{u4}'$ and the constant-velocity torque $\tau_{c4}'$ are derived. The operation in step S11 constitutes a second velocity determiner. The operation in step S12 constitutes a second torque determiner. A second action period of time corresponds to the first action period of time.

After step S13, the routine proceeds to step S14 wherein parameters, as derived in steps S10 to S13, are substituted into the following equation (8) to derive $l_h \sin(\theta_4'+\theta_h)$.

$$l_h \sin(\theta_4'+\theta_h)=(\tau_{c4}'-\tau_{u4}')\text{Gear}/[m\{(2\varphi_1'+\varphi_2')\varphi_1'L_2+\varphi_1'^2(L_1+L_2)\}] \quad [8]$$

The routine proceeds to step S15 wherein it is determined whether the positions $\theta_4=0°$, and the position $\theta_4'=90°$.

If a YES answer is obtained in step S15 meaning that $\theta_4=0°$, and $\theta_4'=90°$, then the routine proceeds to step S17 wherein Eq. (7) is given by $$l_h \sin(\theta_4+\theta_h)=l_h \sin \theta_h = y_{cog} \quad (9)$$

Eq. 8 is also given by $$l_h \sin(90°+\theta_h)=l_h \cos \theta_n = x_{cog} \quad (10)$$

In the above way, the position of the center of gravity, i.e., the x-coordinate $x_{cog}$ and the y-coordinate $y_{cog}$ of the workpiece 11 are derived.

Alternatively, if a NO answer is obtained in step S15 meaning that the condition where $\theta_4=0°$, and $\theta_4'=90°$ is not met, then the routine proceeds to step S16 wherein the x-coordinate $x_{cog}$ and the y-coordinate $y_{cog}$ are derived according to equations (11) and (12) below.

If $T_1=l_h \sin(\theta_4+\theta_h)$, and $T_2=l_h \sin \theta_4'+\theta_h$, then Eqs. (11) and (12) are $$l_h \sin \theta_h = (T_1 \sin \theta_4'-T_2 \sin \theta_4)/\sin(\theta_4'-\theta_4)$$

$$l_h \cos \theta_h = (T_1 \cos \theta_4'-T_2 \cos \theta_4)/\sin(\theta_4-\theta_4') \quad (12)$$

The operations in step S15 to S17 constitute a center-of-gravity position calculator.

If there is an error or deviation between an actual position of the center of gravity of the workpiece 11 and the position (i.e., the x-coordinate $x_{cog}$ and the y-coordinate $y_{cog}$) of the center of the gravity of the workpiece 11 calculated in the above way, the calculated position may be corrected using a correction factor as a function of the error.

The controller 3 outputs the position of the center of the gravity of the workpiece 11 to the teaching pendant 4. The teaching pendant 4 is equipped with a display and indicates the position of the center of the gravity of the workpiece 11 on the display. For instance, a human operator for the robot 2 visually checks the position of the center of the gravity of the workpiece 11 on the display and determine whether the position of the center of the gravity of the workpiece 11 is in a permissible range or not. If it is in the permissible range, the operator informs the controller 3 of the fact that the workpiece 11 is correctly held by the arm 8. If not, the operator informs the controller 3 of the fact that the fact that the workpiece 11 is incorrectly held by the arm 8. These operations may alternatively automatically achieved by a control device instead of the human operator.

As apparent from the above discussion, the controller 3 is engineered to determine the angular velocities $\omega_1$ and $\omega_2$ of the first and second axes J1 and J2 in the constant-velocity range in the first action period of time between when the arm of the horizontal four-axis robot 2 which is holding the workpiece 11 whose mass m is known is at the first initial position and when the first and second axes J1 and J2 are actuated, so that the arm reaches the first calculation position. The controller 3 also determines the static torque $\tau_{u4}$ and the constant-velocity torque $\tau_{uc}$ of the fourth axis J4 in the first action period of time and then uses such parameters to calculate the first parameter $T_1$.

The controller 3 also determines the angular velocities $\omega_1'$ and $\omega_2'$ of the first and second axes J1 and J2 in the constant-velocity range in the second action period of time between when the arm of the robot 2 is at second initial position and when the arm reaches the second calculation position. The second initial position is a position of the arm where the position of the fourth axis J4 is changed from $\theta_4$ (i.e., the first initial position) to $\theta_4'$. The controller 3 further determines the static torque $\tau_{u4}'$ and the constant-velocity torque $\tau_{uc}'$ of the fourth axis J4 in the second action period of time and then uses such parameters to calculate the second parameter $T_2$. Finally, the controller 3 calculates the position (i.e., the x-coordinate $x_{cog}$ and the y-coordinate $y_{cog}$) of the center of gravity of the workpiece 11 using the first and second parameters $T_1$ and $T_2$.

In brief, the controller 3 works to horizontally move the workpiece 11 two times in conditions where the fourth axis J4 is kept at the respective angular positions $\theta_4$ and $\theta_4'$ and calculate the parameters $T_1$ and $T_2$ as a function of torque acting on the fourth axis J4. The controller 3 then uses the parameters $T_1$ and $T_2$ to calculate the position (i.e., the x-coordinate $x_{cog}$ and the y-coordinate $y_{cog}$) of the center of gravity of the workpiece 11 in a horizontal plan of the robot 2 equipped with the horizontal four-axis arm. In this way, the first and second axes J1 and J2 are moved to exert a greater degree of centrifugal force or torque on the workpiece 11, thereby enhancing the accuracy in calculating the position of the center of gravity of the workpiece 11 held by the arm of the robot 2.

The controller 3 sets one of the fourth-axis positions (i.e., the positions of the fourth axis J4) $\theta_4$ and $\theta_4'$ to 0° and the other to 90°. This achieves fast and simple calculation of the center-of-gravity positions $x_{cog}$ and $y_{cog}$ of the workpiece 11 using the first and second parameters $T_1$ and $T_2$.

The above movement of the arm of the robot 2 is, as described above, achieved by keeping the third axis J3 at the upper end (i.e., the upper limit) thereof. This minimizes the mechanical vibration transmitted from the third axis J3 to the workpiece 11 when the arm is moved to the first or second calculation position, thereby enhancing the accuracy in calculating the position of the center of gravity of the workpiece 11.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

For example, the first and second initial positions and the first and second calculation positions may be changed as needed.

If a degree of torque great enough to calculate the position of the center of gravity of the workpiece 11 is derived, either one of the first and second axes J1 and J2 may be actuated.

If the adverse effect of the vibration of the workpiece 11 is acceptable, the third axis J3 does not always need to be kept at the upper limit thereof.

The order in which the steps S5 and S6 are executed may be reversed. The order in which the steps S12 and S13 are executed may be reversed.

The robot 2 may be designed to have any three of the axes J1, J2, J3, and J4 which are rotated around them and the remaining one which is moved vertically (i.e., the z-axis direction). For instance, the robot 2 may be engineered to have only the axis J1 to be movable vertically.

What is claimed is:

1. An apparatus for calculating center-of-gravity-of-load position for a horizontal four-axis robot arm which is equipped with a first, a second, a third, and a fourth axis, comprising:
   a controller programmed to:
      instruct the robot arm, which is holding a physical load of a known mass on an end thereof, to actuate at least one of the first axis and the second axis to move the robot arm from a first initial position to a first calculation position;
      determine a first velocity of the one of the first axis and the second axis in a first constant-velocity range where the velocity of the one of the first and second axes is constant in a first action period of time between when the robot arm is at the first initial position and when the robot arm reaches the first calculation position;
      determine a first static torque and a first constant-velocity torque, the first static torque being torque exerted on the fourth axis to hold the fourth axis from being rotated, so that the fourth axis is kept at an angular position thereof before the one of the first and second axes is actuated in the first action period of time, the first constant-velocity torque being torque required for the fourth axis to cancel torque which results from rotation of one of the first and second axes so as to keep the fourth axis stationary while the one of the first and second axes is being actuated in the first action period of time;
      calculate a first parameter according to an equation below which is derived using the first velocity and the first static torque, $$T_1 = l_h \sin(\theta_4 + \theta_h)$$

where $T_1$ is the first parameter, $l_h$ is a center-of-gravity distance between the fourth axis and the physical load, $\theta_4$ is a position of the fourth axis, and $\theta_h$ is an angular position of the physical load based on the position $\theta_4$;
      instruct the robot arm to actuate at least one of the first axis and the second axis to move the robot arm from a second initial position to a second calculation position, the second initial position being a position of the robot arm where the position of the fourth axis is changed to a position $\theta_4'$ from that of the fourth axis when the robot arm is at the first initial position, the second calculation position being a position of the robot arm where positions of the first, the second, and the third axis are identical with those thereof when the robot arm is at the first calculation position;
      determine a second velocity of the one of the first axis and the second axis in a second constant-velocity range where the velocity of the one of the first and second axes is constant in a second action period of time between when the robot arm is at the second initial position and when the robot arm reaches the second calculation position;
      determine a second static torque and a second constant-velocity torque of the fourth axis in the second action period of time;
      calculate a second parameter according to an equation below which is derived using the second velocity and the second static torque, $$T_2 = l_h \sin(\theta_4' + \theta_h)$$

where $T_2$ is the second parameter, and $\theta_4'$ is the position of the fourth axis when the robot arm is at the second initial position; and
      calculate a position of the center of gravity of the physical load using the first and second parameters.

2. The apparatus as set forth in claim 1, wherein controller is programmed to instruct the robot arm to actuate both the first and second axes.

3. The apparatus as set forth in claim 1, wherein the controller is programed to set one of the positions $\theta_4$ and $\theta_4'$ to 0° and other to 90°.

4. The apparatus as set forth in claim 1, wherein the controller is programed to instruct the robot arm to keep the third axis at an upper limit thereof in the first action period of time or the second action period of time.

5. A center-of-gravity-of-load position calculating method for a horizontal four-axis robot arm which is equipped with a first, a second, a third, and a fourth axis, comprising:
   a first step of actuating at least one of the first axis and the second axis of the robot arm which is holding a physical load on an end thereof to move the robot arm from a first initial position to a first calculation position, the physical load having a known mass;
   a second step of determining a velocity of the one of the first axis and the second axis in a constant-velocity range where the velocity of the one of the first and second axes is constant in a first action period of time between when the robot arm is at the first initial position and when the robot arm reaches the first calculation position;

a third step of determining a static torque and a constant-velocity torque, the static torque being torque exerted on the fourth axis to hold the fourth axis from being rotated, so that the fourth axis is kept at an angular position thereof before the one of the first and second axes is actuated in the first action period of time, the constant-velocity torque being torque required for the fourth axis to cancel torque which results from rotation of one of the first and second axes so as to keep the fourth axis stationary while the one of the first and second axes is being actuated in the first action period of time;

a fourth step of calculating a first parameter using the velocity and the static torque according to an equation below $$T_1 = l_h \sin(\theta_4 + \theta_h)$$

where $T_1$ is the first parameter, $l_h$ is a center-of-gravity distance between the fourth axis and the physical load, $\theta_4$ is a position of the fourth axis, and $\theta_h$ is an angular position of the physical load based on the position $\theta_4$;

a fifth step of actuating at least one of the first axis and the second axis of the robot arm to move the robot arm from a second initial position to a second calculation position, a second initial position being a position of the robot arm where the position of the fourth axis is changed to a position $\theta_4'$ from that of the fourth axis when the robot arm is at the first initial position, the second calculation position being a position of the robot arm where positions of the first, the second, and the third axis are identical with those thereof when the robot arm is at the first calculation position;

a sixth step of determining a velocity of the one of the first axis and the second axis in a constant-velocity range where the velocity of the one of the first and second axes is constant in a second action period of time between when the robot arm is at the second initial position and when the robot arm reaches the second calculation position;

a seventh step of determining the static torque and the constant-velocity torque of the fourth axis in the second action period of time;

an eighth step of calculating a second parameter using the velocity and the static torque, as determined in the seventh step, according to an equation below $$T_2 = l_h \sin(\theta_4' + \theta_h)$$

where $T_2$ is the second parameter, and $\theta_4'$ is the position of the fourth axis when the robot arm is at the second initial position; and a ninth step of calculating a position of the center of gravity of the physical load using the first and second parameters.

6. A center-of-gravity-of-load position calculating method as set forth in claim 5, wherein each of the first and fifth steps actuates the first and second axes.

7. A center-of-gravity-of-load position calculating method as set forth in claim 5, wherein each of the fourth and eighth steps sets one of the positions $\theta_4$ and $\theta_4'$ to 0° and other to 90°.

8. A center-of-gravity-of-load position calculator as set forth in claim 5, wherein each of the first and the fifth steps keeps the third axis at an upper limit thereof in the first action period of time or the second action period of time.

* * * * *